United States Patent [19]
Carpenter, Jr.

[11] Patent Number: 5,532,897
[45] Date of Patent: Jul. 2, 1996

[54] HIGH-VOLTAGE SURGE ELIMINATOR

[75] Inventor: Roy B. Carpenter, Jr., Boulder, Colo.

[73] Assignee: Lightning Eliminators & Consultants, Inc., Boulder, Colo.

[21] Appl. No.: 250,584

[22] Filed: May 27, 1994

[51] Int. Cl.⁶ .................................................. H02H 9/04
[52] U.S. Cl. ........................ 361/118; 361/126; 361/133; 361/58; 361/111
[58] Field of Search .................................. 361/118, 111, 361/113, 117, 126, 133, 58

[56] References Cited

U.S. PATENT DOCUMENTS

| | | | |
|---|---|---|---|
| 4,667,158 | 5/1987 | Redlich | 324/207 |
| 4,743,997 | 5/1988 | Carpenter | 361/118 |

Primary Examiner—A. D. Pellinen
Assistant Examiner—Sally C. Medley
Attorney, Agent, or Firm—Rick Martin

[57] ABSTRACT

A high voltage substation level surge suppression system is disclosed comprising three primary elements. Two surge arrestors are used, separated by a surge interceptor. The first surge arrestor encountered is a high energy dissipater. It conducts most of the energy from a lightning induced or other fast rising high voltage surge to ground. The surge interceptor, comprises an inductor formed by wrapping insulated wire around a tube through which is inserted a parallel high energy resistor. The inductor element in the Surge Interceptor operates to delay the fast rise surge or transient long enough that the high energy dissipater can operate. The resistor element operates to dampen ringing or oscillations caused by the interaction between the inductor and a high voltage lightning strike and to dissipate some of that energy. Finally, the second arrestor, the voltage controller, operates to clamp the voltage after the Surge Interceptor to a set level. Additionally, right angle turns are introduced into the circuit that exploit lightning induced surges' reluctance to negotiate the right angle turns due to the surges' high inertia.

17 Claims, 5 Drawing Sheets

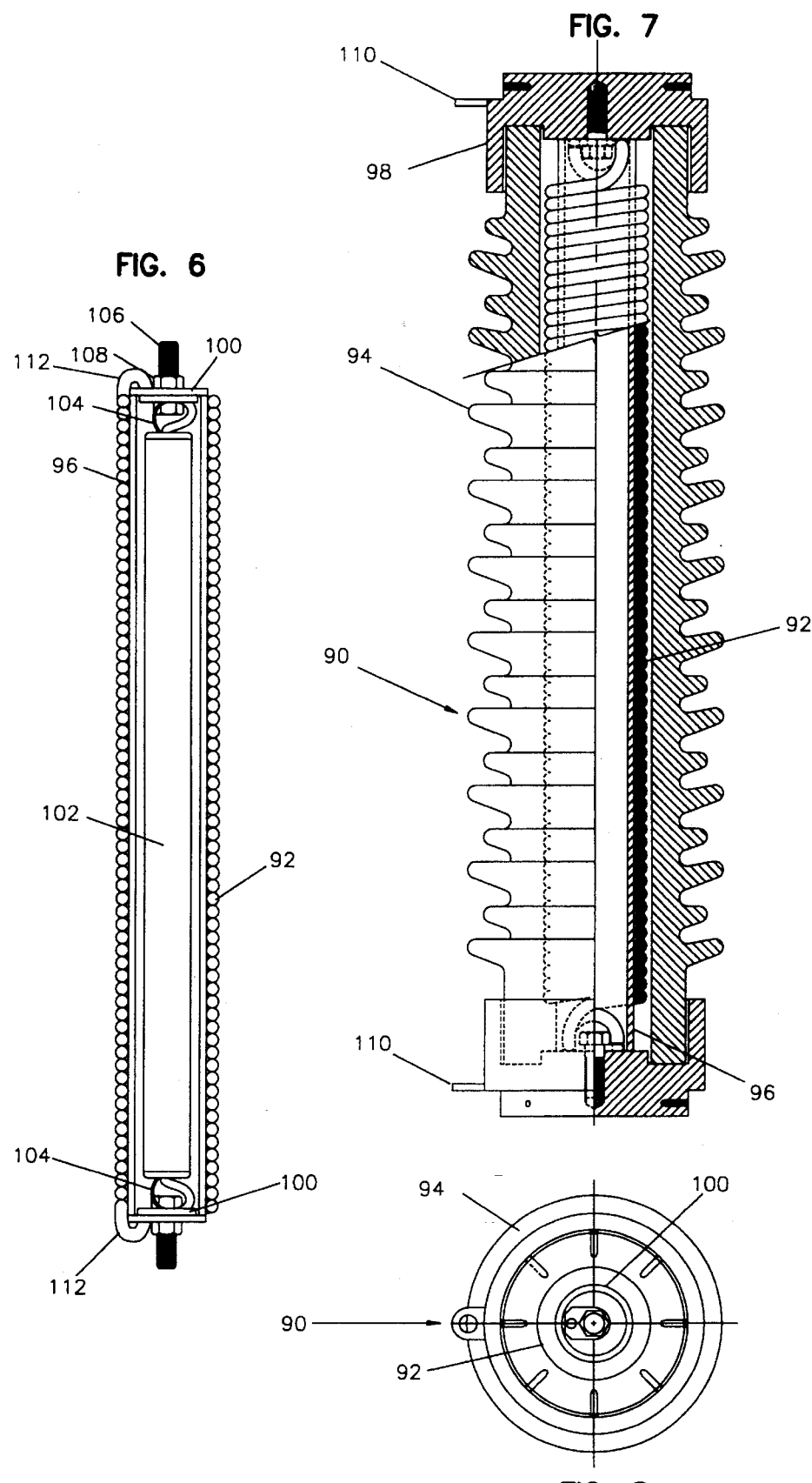

HIGH-VOLTAGE SURGE ELIMINATOR

CROSS REFERENCED PATENTS

U.S. Pat. No. 4,743,997 (1988) to Carpenter, Jr. is incorporated herein by reference.

FIELD OF THE INVENTION

The present invention relates to surge suppression or elimination. In particular the present invention discloses apparatus and method of suppressing high voltage surges such as those caused by lightning strikes to high voltage transmission lines and electricity distribution stations.

BACKGROUND OF THE INVENTION

Electric transmission lines and distribution stations, especially those of the outdoor variety and substation classification, are especially exposed to and vulnerable to voltage surges, transients, and atmosphere discharges, including those caused directly and indirectly by lightning.

Various methods, means, and devices are known to protect electric distribution systems and transmission lines and equipment supplied by them.

There is considerable prior art concerning protection of fixed structures. Indeed, Ben Franklin two hundred years ago pioneered the use of lightning rods, describing a cone of protection. Since then the cone of protection has been refined, and recently scientists have come to an understanding why it does not work exactly as predicted. A new art was introduced as the Dissipation Array® System by Lightning Eliminators & Consultants, Inc. which prevents a direct strike.

Low voltage surge suppression devices are also common. They are used routinely to protect electronic devices from large voltage surges, as for example caused by lightning strikes. A few work by burning out. Their low cost allows them to be economically replaced.

Neither of the above two approaches alone is realistically feasible for use with high voltage transmission lines and electrical distribution systems. While it is practical to shield transformers with the lightning rods and dissipation arrays, it is not economically practical to likewise protect the high voltage lines coming into and leaving such transformers. However, by their vary nature high voltage lines continuously receive numerous lightning induced high voltage surges, and thus destructive protection is also not economically practical.

U.S. Pat. No. 4,743,997 (1988) to Roy Carpenter Jr. discloses a high-voltage type surge elimination system. It shows a system where two surge arrestors are used to ground high voltage lightning surges. The two surge arrestors are separated by a surge interceptor, which by the use of an induction delays a fast rising surge long enough for the first arrestor to operate. The performance of this system is an improvement over the use of surge arrestors without the intervening surge interceptor.

FIG. 9 shows the '997 surge elimination system 118. High voltage power enters 150 the system 118. There is a high energy surge arrestor 120 connected between the input 152 and ground 154. The high energy arrestor 120 is comprised of a spark gap 122 and a solid state device 124. The high voltage power then flows through a surge interceptor (SI) 130 connected between the high energy arrestor 120 and a lower energy arrestor 140. The SI has a core 132 and an inductor 134. The low energy surge arrestor 140 is comprised of a solid state device. It is connected between the SI 156 and ground 158. High power leaving 160 the system 118 is limited as to its maximum voltage.

The current invention improves upon the '997 invention in several ways. First, three 90° right hand turns are introduced into the high voltage circuit. These exploit the fact that lightning strike induced surges have high inertia, and thus resist right angle turns. This was not disclosed in the '997 patent.

Secondly, the surge interceptor is improved. The '997 patent shows a surge interceptor that has toroidal rings around one metal cylinder, located in another cylinder. The surge interceptor in the instant invention comprises a low capacitance wirewrapped hollow fiberglass tube encased in ceramic insulation.

Finally, a high energy resistor is added in parallel to the inductor in the surge interceptor. This has the effect of dampening the ringing or oscillation found on the output side of the '997 surge interceptor. The addition of a high energy resistor was also not present in the '997 patent.

SUMMARY OF THE INVENTION

The main object of this invention is improved high voltage surge protection for protecting substations, and to prevent the passage of surges from incoming transmission lines to outgoing distribution lines.

Another object of this invention is the provision of improved protection of high voltage substations by the introduction of right angle turns in the three phase power lines feeding transformers.

Another object of this invention is the reduction in costs in the construction of a power substation through the purchase of lower Basic Insulation Level (BIL) components.

Another object of this invention is the improvement of surge interceptors by the introduction of a ceramic insulated wire wrapped core surge interceptor.

Another object of this invention is the improvement of surge interceptors by the introduction of a high energy resistor in parallel with the surge interceptors' inductive elements in order to minimize the ringing or oscillation caused by a fast rising high voltage surge.

Other objects of this invention will appear from the following description and appended claims, reference being had to the accompanying drawings forming a part of this specification wherein like reference characters designate corresponding parts in the several views.

To eliminate the risk of fast rising high current surges, two protection systems characteristics are required:

1) The prevention of direct strikes to any operational component within a substation, and 2) The prevention of the passage of these fast rising, high current into the substation. These may be surges caused by lightning strikes or switching actions.

The first system characteristic is answered by the use of the modern equivalent of Ben Franklin's lightning rod. For example, model SBI-48 strike protection systems from Lightning Eliminators & Consultants, Inc. (LEC) are used to protect numerous electrical substations and their components nationwide.

The second system characteristic has long been available to a limited extent through the usage of station level surge arrestors. These devices limit discharge overvoltage by simultaneously forming a low impedance path to ground. However, the performance of a conventional surge arrestor operating alone for this function depends on many factors, some of which cannot be controlled. When a lightning arrestor is installed at some distance from the apparatus to be protected, such as a transformer or a circuit breaker, there is always the potential for some overvoltage across the transformer. Furthermore, where conventional arrestors are used, the traveling surge wave may reach a transformer terminal before the arrestor operates. In that case, the surge voltage wave reflected from the transformer will almost double in amplitude and endanger the transformer's insulation.

Additionally, regardless of an arrestor's reaction time, its use in a parallel circuit cannot provide instant reaction. Thus, the protective effect of surge arrestors against fast rising overvoltages is limited. A certain "separation distance" or "limiting distance" is often used to reduce the rise time of a surge. In severe cases, these separation or limiting distances are not adequate for the surge arrestor to operate and conduct the surge to earth. Therefore, there will always exist some risk of voltage overshoot for a short period of time using a conventional arrestor alone.

The above cited '997 patent addressed the weakness of high energy surge arrestors by the use of two surge arrestors separated by a Surge Interceptor (SI). The SI operates to slow a fast moving surge down long enough for it to be grounded through the high energy station level arrestor. The SI must present a high impedance to an incoming surge, but virtually none to operating voltage. Further, it must not allow higher frequency transients to pass through or bypass around it.

The instant invention improves on the prior art in several ways. First, a lightning induced surge's high momentum is exploited by introducing several 90° turns into the system. This exploits the fact that these surges are strongly limited in their ability to negotiate sharp turns. Instead of following transmission lines, such a lightning induced surge will often arc and ground when faced with a turn.

Secondly, an improved Surge Interceptor (SI) is disclosed. It is comprised of insulated wire wrapped around a hollow fiberglass tube. The amount of insulation can be increased by embedding the insulated wire in epoxy or another like resin. The wire wrapped tube is then further insulated by enclosure in a ceramic shell.

Finally, a high energy resistor can be added to a Surge Interceptor to dampen the ringing or oscillation caused by a voltage surge or transient.-The resistor is connected in parallel with the inductor resulting from wirewrapping the fiberglass tube. The high energy resistor can be housed or placed in the center of the hollow fiberglass core described above.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 6 is a lengthwise cross-sectional view of a Surge Interceptor without an insulated shell.

FIG. 7 is a lengthwise cutaway view of a Surge Interceptor inserted in its insulated shell.

FIG. 8 is a cross-sectional view of a Surge Interceptor as shown in FIG. 7 taken along the main axis.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE INVENTION

Figure 1:
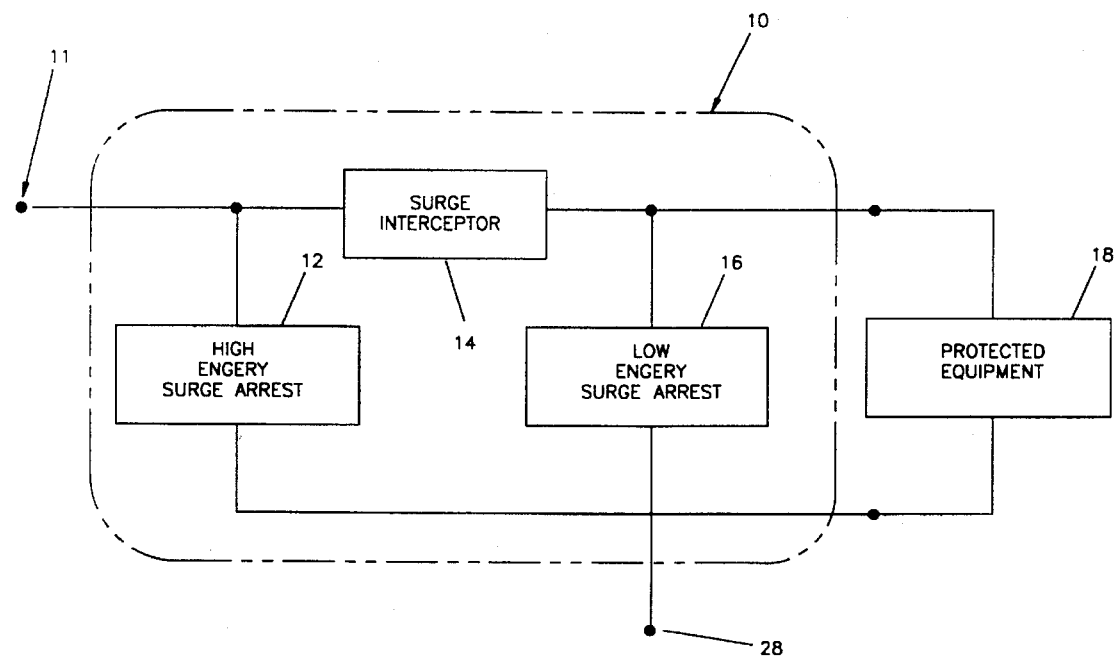
FIG. 1 is a high level schematic of a system containing a station level high energy arrestor in parallel with a distribution or intermediate level low energy surge arrestor. These are separated by a Surge Interceptor.

FIG. 1 is a high level schematic of a surge suppression system 10. It includes a station level high energy surge arrestor 12 and a transmission or intermediate level low energy surge arrestor 16. Both are connected to ground and separated by a Surge Interceptor 14. They all operate together to protect power station equipment 18 such as a transformer.

The station level arrestor or High Energy Dissipater 12 is used to dissipate most of the surge energy within it, and the grounding system impedance. The surge arrestors 12, 14 bypass the surge energy to ground 28. The series impedance or Surge Interceptor 14 is used to delay an incoming surge long enough to allow the high energy surge arrestor 12 to conduct and limit the peak voltage to a safe level without any overshoot. The surge interceptor provides inductance with negligible capacitance and is designed to work with the ultra high voltages found in electric substations and the higher level power grid. The surge interceptor may also have a resistive element to filter out or dampen high frequency transients. The low energy surge arrestor 16 is a second parallel element. It is selected to clamp the peak voltage at some level well below the break down voltage of the insulation. The rise time has been reduced by factors of up to 100 to 1 at this point because of the surge interceptor 14.

The surge interceptor 14 must present a high impedance to an incoming surge, but virtually none to operating voltages. Further, it must not allow the higher frequency transients to pass through or bypass it. This requires an input to output capacitance of less than 50 picofarads.

The use of such a surge suppression system 10 system allows significantly lower break down voltage levels of the insulation to be used in the substation design. Thus, substation cost can be reduced by the introduction of a surge suppression system 10 since the money saved through lower cost insulation reduction more than offsets the surge suppression system 10 cost.

Figure 2:
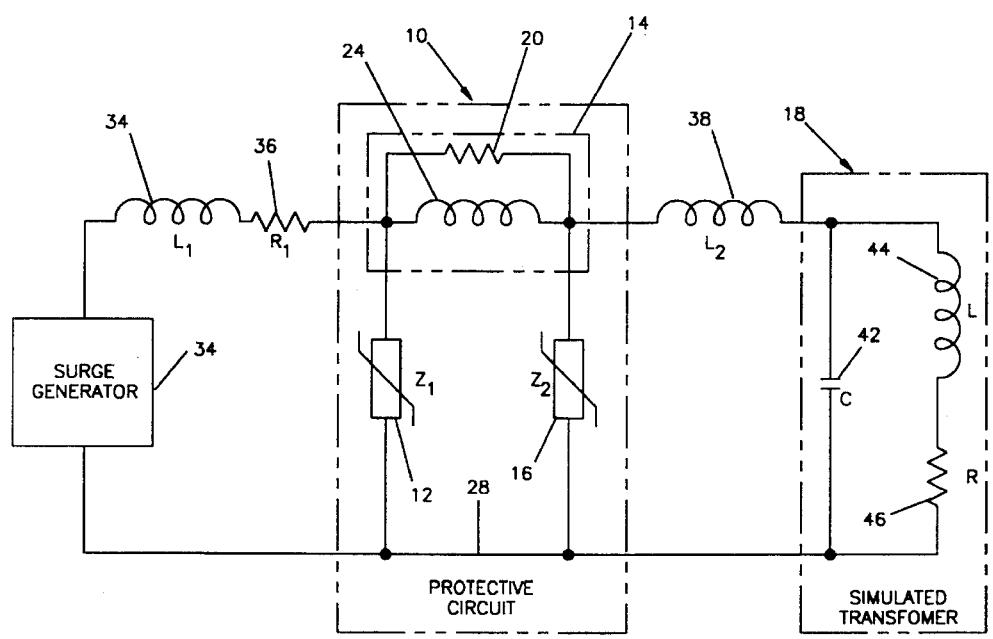
FIG. 2 is a schematic of the circuit shown in FIG. 1 with the addition of a surge generator and a simulated transformer.

FIG. 2 is a schematic of a system used to test the surge suppression system 10 shown in FIG. 1. The surge suppression system 10 consists of a High Energy surge arrestor 12, Surge Interceptor inductor 14, and low energy surge arrestor 16 configured as shown in FIG. 1. The high energy surge arrestor 12 and low energy surge arrestor 16 are connected to ground 28. The surge interceptor 14 tested had approximately 60 microhenries inductance 24 with less than 50 picofarads capacitance, input to output. A high energy resistor 20 is connected in parallel to the surge interceptor 14 inductor 24 between the high energy surge arrestor 12 and low energy surge arrestor 16 in order to eliminate any ringing and oscillation caused by the interaction between the surge interceptor 14 inductor 24 and a fast rising, high voltage lightning caused surge.

To demonstrate surge suppression system 10 performance, a surge generator 32 was used to generate the test surges. The input circuit was assumed to be equal to about 2 ohms of resistance 36 and 20 microhenries of inductance 34. The inductance 38 between the surge interceptor 14 and the transformer 18 is assumed to be 2 microhenries 38. The transformer 40 being protected has a capacitance of 1000 picofarads 42 in parallel with an inductance of 0.15 millihenries 44 in series with a resistance of 4 ohms 46.

Figure 3:
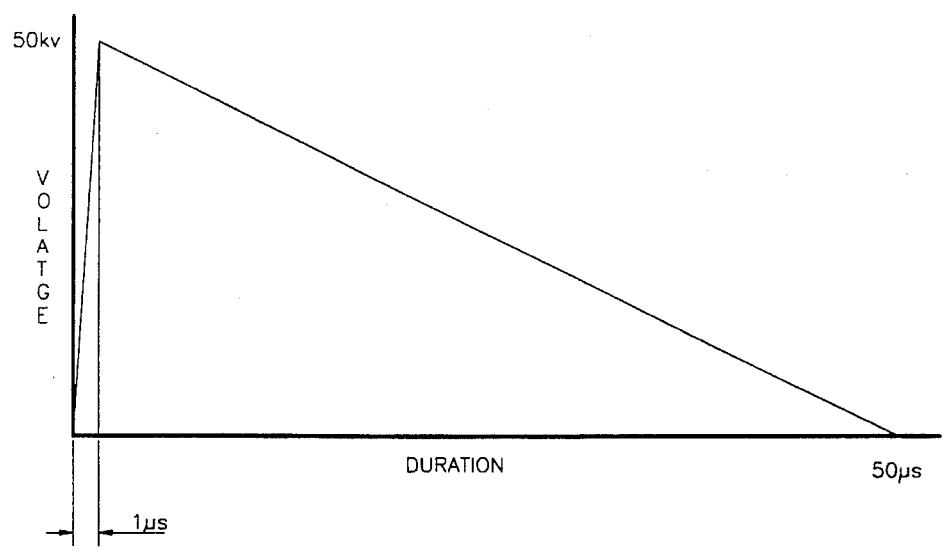
FIG. 3 is a graph of the voltage over time simulating a lightning strike.

FIG. 3 is a graph of the test waveform utilized in testing. Note the extremely fast rise in 1 µs from zero to 50 KV, decaying back to zero over the next 49 µs. This is a reasonable representation of the effects of a lightning strike. This waveform was applied during testing by the waveform generator 32 shown in FIG. 2.

Figure 4:
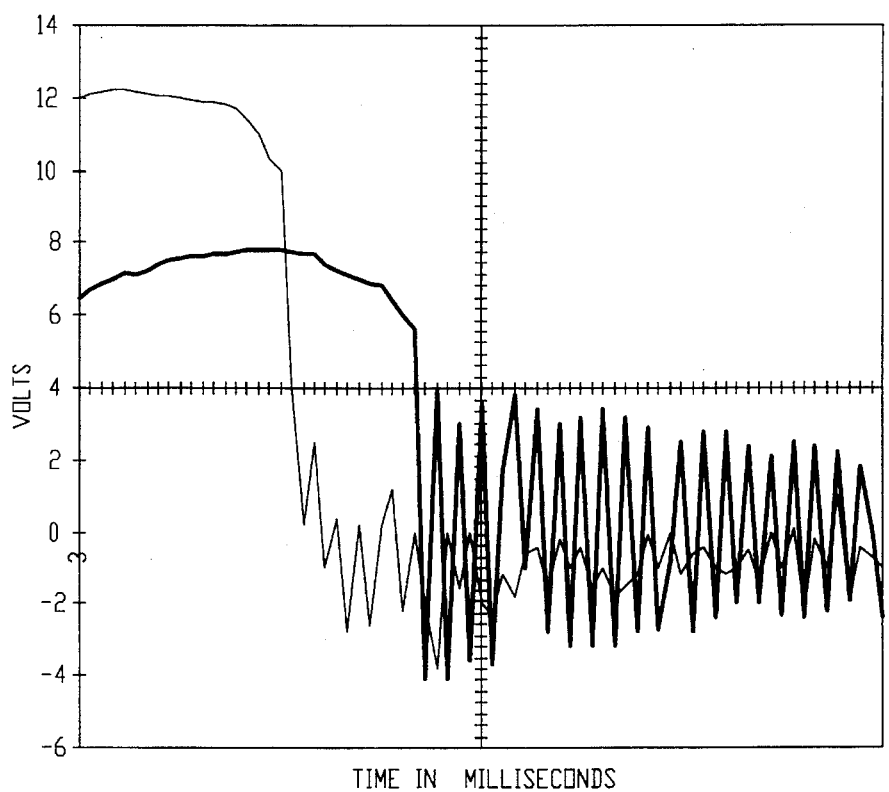
FIG. 4 is a graph showing the effect of delaying voltage through the use of a Surge Interceptor.

FIG. 4 illustrates the results of the test described above. The 50 KV surge generator 32 input is reduced to 12.5 KV (shown in trace 2) at the input to the Surge Interceptor 14 and down to 7.5 KV (shown in trace 3) at the output of the Surge Interceptor 14. The 7.5 KV was the clamping point selected for the test. It could have been higher or lower, depending on normal line voltage and the required protection level. The ratio of surge interceptor 14 input peak voltage to output peak voltage will remain approximately the same, regardless of the substation operating voltages. That is, the output of the surge interceptor 14 is expected to be not more than 60 percent of that at the input of the surge interceptor 14.

Note the ringing or oscillation shown in the two graphs in FIG. 4. In particular note that there is some ringing or oscillation as a result of a lightning strike. One primary purpose of the resistor in parallel with the surge interceptor 14 inductance is to dampen the oscillation caused by a lightning strike.

Figure 5:
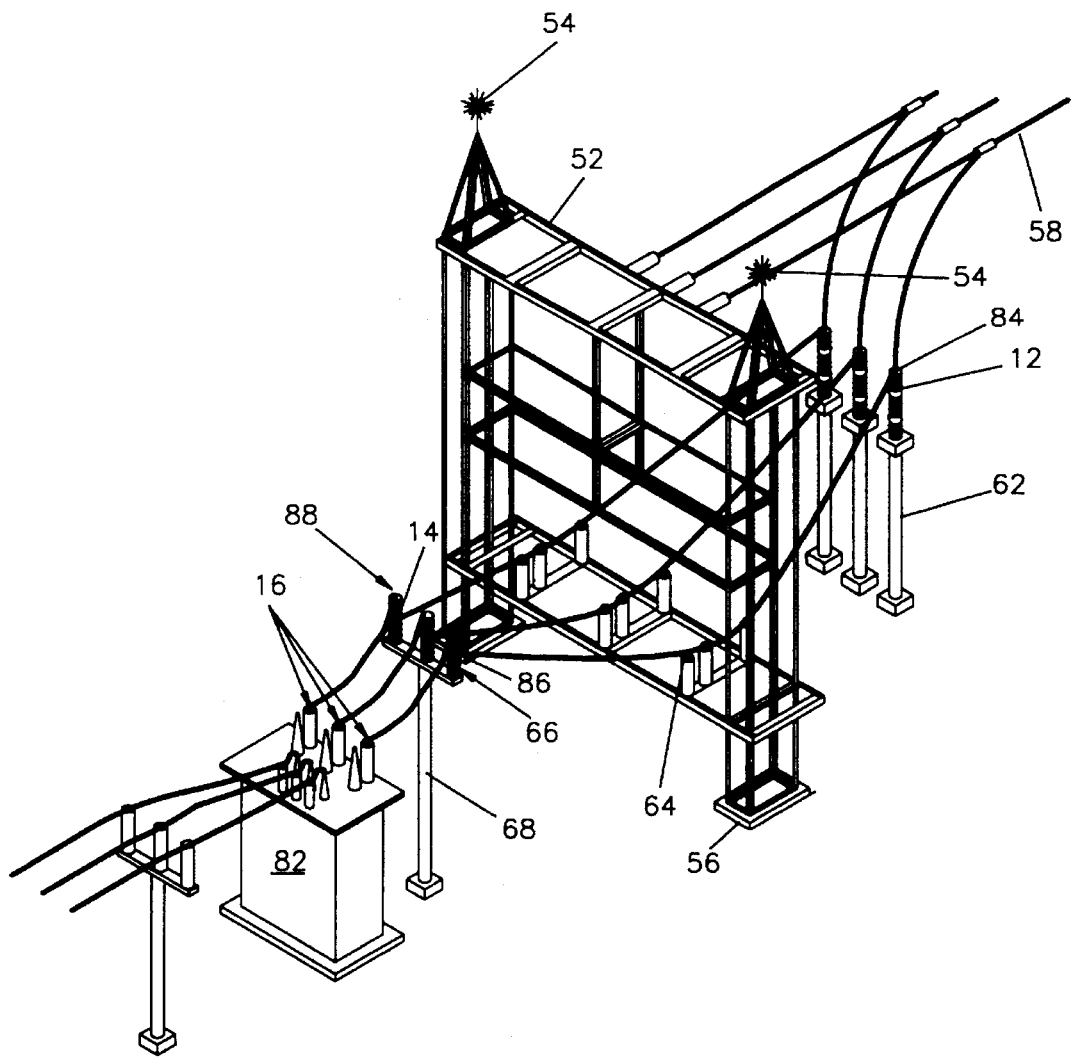
FIG. 5 is a partial view of a substation showing incoming high voltage lines and associated transformer.
Figure 9:
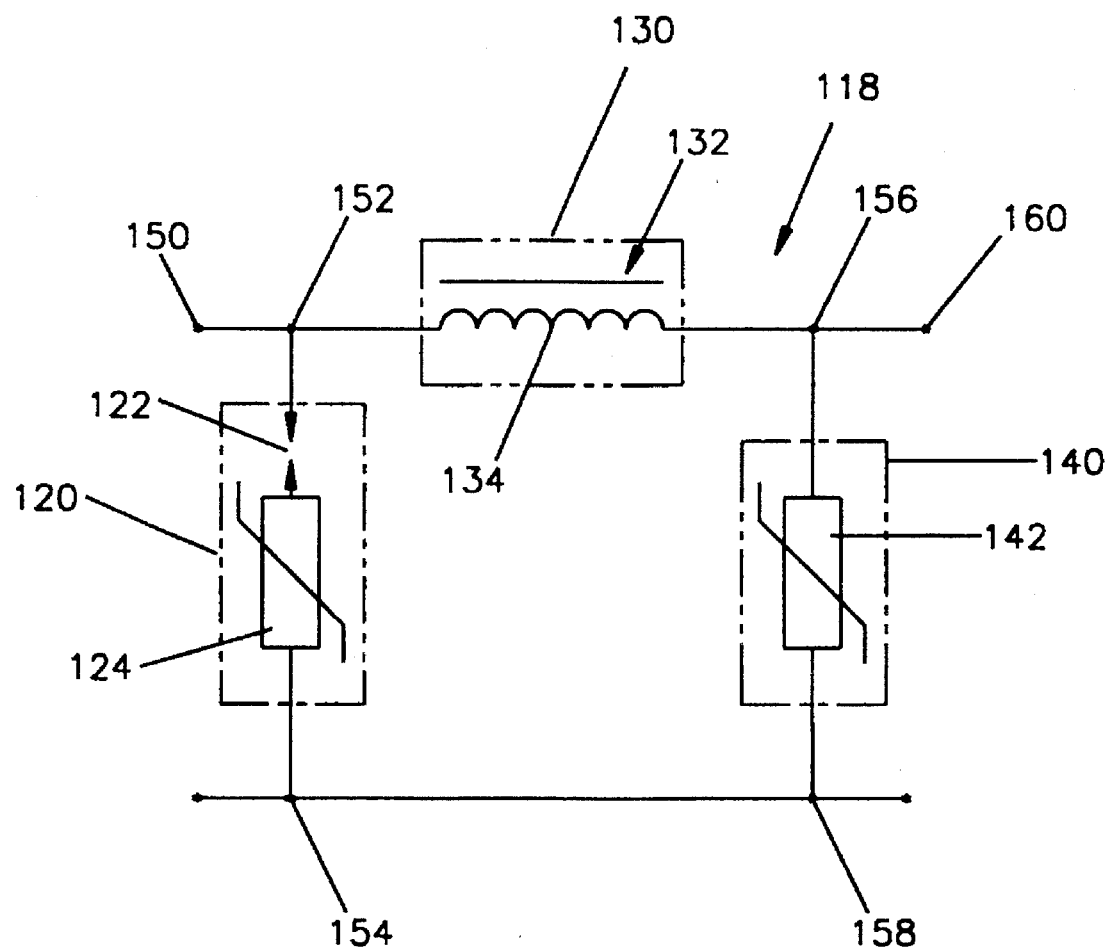
FIG. 9 (Prior Art) is a circuit drawing showing the surge suppression system disclosed in the U.S. Pat. No. 4,743,997.

FIG. 5 shows implementation of the surge suppression system 10 where the Surge Interceptor 14 is integrated into the substation design. In this design, three 90 degree turns 84, 86, 88 are made. These turns are utilized because a lightning related surge is a traveling wave, moving at a high velocity. The inertia of motion of that wave is-such that it will avoid making right angle turns whenever possible. It will often jump across an air gap and to the ground. Thus, the use of multiple right angle turns further enhances the performance of a substation protection system.

The disclosed substation protection system uses an LEC model SBI-48 strike interceptor 52 to protect the system against direct lightning strikes. Lightning strikes the interceptor 52 usually at one of the lightning rods 54. The surge is directly conducted to ground 56. This operates to protect an area or humapheric volume that includes the transformer 82. A Dissipation Array® System by LEC may be used instead of lightning rods 54, operating to dissipate the storm generated charge before there is a chance for lightning strikes.

Transmission power enters the system on high voltage three phase lines 58. These lines are connected first to High Energy Surge Arrestors 12, which are station level surge arrestors. These high energy surge arrestors 12 conduct most of the energy of an incoming surge to ground through support structures 62. Any form of high energy surge arrestor design will function satisfactorily in this location. It is connected between the high voltage line and the substation ground plane through support structures 62.

After the high energy surge arrestors 12, electricity is conducted through appropriate lines supported by insulators 64 attached to the strike interceptor 52, then to the Surge Interceptors (SI) 14. Note the two right angle turns 86, 88 here that any electric power (including strikes and surges) must negotiate. As pointed out above, the right angle turns 86, 88 are useful in controlling lightning strike line surges. The surge interceptors 14 are encapsulated in ceramic insulated bushings and stand on conventional insulators 66 and a support structure 68 connected to ground. The above referenced right angle turns 86, 88 in the power transmissions naturally follows from the vertical orientation of the surge interceptors 14 and related insulators 66 and support structure 68. After leaving the surge interceptors 14, the three power lines are connected to low energy surge arrestors 16 which are transmission, intermediate, or distribution level surge arrestors. The low energy surge arrestors 16 clamp the voltage from the surge interceptors 14 to a specified level. These low energy surge arrestors 16 are connected to the transformer 82. The low energy surge arrestors 16 are also grounded through the transformer 82. Finally, power leaves the transformer 82 stepped down to intermediate or distribution levels.

FIG. 6 is a cutaway view of a Surge Interceptor 14 as shown in FIG. 5 except that it is shown without its ceramic insulating shell here. The Surge Interceptor 14 uses various sized special type wire selected for its amperage requirement, 92 wrapped around a fiberglass tube 96 with fiberglass plugs 100 at each end of the tube 96. Additional insulation may be provided by the encapsulation of the wrapped wire 92 in epoxy resin such that the wire 92 is embedded in the epoxy resin. The wire 92 is electrically connected 112 to nuts 108 and bolts 106 located on both ends of the fiberglass tube 96. A resistance element is inserted into the fiberglass tube 96 and is held in place with springs 104 or other appropriate medium. A wire 92 wrapped tube 96 is an inductor with the inductance proportional to the number of turns of wire 92 around the tube 96.

In one disclosed embodiment, capable of handling 100 amps, the fiberglass cylinder or tube 96 has a length of 35 inches, and a radius of 21 inches. It has 70 turns of 1/0 sized wire 92 wrapped around the fiberglass tube 96. This results in inductance of approximately 58 µH with capacitance of approximately 0.85×mF. A 50 KV high energy carbon 1 k ohm resistor rod is inserted into the center of the fiberglass tube 96.

FIG. 7 is a cutaway view of a Surge Interceptor 14 as shown in FIG. 5. FIG. 8 is a cross sectional view of the same Surge Interceptor 14 Surge Interceptor 14 as shown in FIG. 7. The SI 90 consists of insulated wire 92 wrapped around and surrounding a fiberglass tube core 96. The tube core is surrounded and insulated by a ceramic insulation shell 94. There are aluminum caps 98 on both ends. These are connected to power lines through contacts 110.

I claim:

1. A high-voltage surge suppression system for the protection of a high-voltage electric circuit against the effects of transients and atmospheric discharges, including those caused by lightning and switching transients, which comprises:

a high energy surge arrestor;

a surge interceptor; and a low energy surge arrestor, wherein:

said high energy surge arrestor is connected between an input to said surge suppression system and ground;

said low energy surge arrestor is connected between an output to said surge suppression system and ground;

said surge interceptor is connected between said high energy surge arrestor and said low energy surge arrestor in said surge suppression system;

said surge interceptor comprises inductor means where said inductor means has minimal capacitance from input to output; and said inductor means comprises a wire wrapped tube; and resistor means connected in parallel with said inductor means, functioning to dampen high frequency oscillations and to absorb surge energy.

2. A surge suppression system as claimed in claim 1 which further comprises means for dissipating lightning functioning to bypass the surge energy to ground and functioning to delay the surge energy with said inductor means.

3. A surge suppression system as claimed in claim 1 wherein at least two approximately right angled turns are included in the high-voltage electric circuit between said high energy dissipater and said low energy surge arrestor.

4. A surge suppression system as claimed in claim 1 wherein said tube is constructed from fiberglass.

5. A surge suppression system as claimed in claim 1 wherein said surge interceptor further comprises a ceramic insulation shell surrounding said wire wrapped tube and providing electrical insulation.

6. A surge suppression system as claimed in claim 1 wherein insulated wire is used to wrap said wire wrapped tube, and epoxy resin is used to provide additional insulation to said insulated wires.

7. A surge suppression system as claimed in claim 1 wherein said high energy resistor means is located substantially within said wire wrapped tube.

8. A high-voltage surge suppression system for the protection of a high-voltage electric circuit against the effects of transients and atmospheric discharges, including those caused by lightning and switching transients, which comprises:

means for lightning dissipation, means for high energy dissipation, means for surge interception, and means for low energy dissipation, wherein:

said high energy dissipation means and said low energy dissipation means comprise surge arrestors, said high energy dissipation means is connected between an input to said surge suppression system and ground, said low energy dissipation means is connected between an output to said surge suppression system and ground, said surge interception means comprises means for induction and means for high energy resistance in parallel with said induction means, and said induction means has minimal capacitance, said surge interception means is connected between said high energy dissipation means and said low energy dissipation means in said surge suppression system, said induction means comprises a wire wrapped tube, said tube is constructed from fiberglass, said surge interception means comprises a ceramic insulation shell surrounding said wire wrapped tube, insulated wire is used to wrap said tube and additional insulation is provided said insulated wires by embedding said insulated wire in epoxy resin, and said high energy resistance means is located within said wire wrapped tube, and at least two approximately right angled turns are located between said surge interception means and said high and low energy dissipation means.

9. A surge interceptor for use in a high-voltage surge suppression system, said suppression system operating for the protection of high-voltage electric circuits against the effects of transients and atmospheric discharges, including those caused by lightning and switching transients, said surge interceptor comprising:

induction means for slowing high speed surges, high energy resistance means for dampening high frequency oscillations and dissipating surge energy, a first and a second means for connecting the surge interceptor to the high-voltage surge suppression system, and means for insulating said surge interceptor, where:

said surge interceptor has minimal capacitance, said induction means and high energy resistance means are connected together in parallel to said first and second connection means, and said induction means comprises insulated wire wrapped around a tube.

10. A surge interceptor as claimed in claim 9 wherein said insulated wire is further electronically insulated through being embedded in an epoxy resin.

11. A surge interceptor as claimed in claim 9 wherein said insulation means comprises a ceramic insulation shell surrounding the surge interceptor.

12. A surge interceptor as claimed in claim 9 wherein said high energy resistance means is located within said tube.

13. A surge interceptor as claimed in claim 12 further comprising a means for retaining said high energy resistance means within said tube, wherein said tube has a cap at each end, and a mounting means comprises two springs, one spring being located at each end of said tube between one of said caps and the high energy resistance means.

14. A surge interceptor as claimed in claim 13 wherein said tube comprises fiberglass and both said caps comprise aluminum.

15. A surge interceptor as claimed in claim 9 wherein said first and second connection means comprise aluminum caps with contacts.

16. A surge interceptor as claimed in claim 9 wherein said high energy resistance means comprises a carbon resistor rod and means for connecting said high energy resistance means to the remainder of said surge interceptor.

17. A surge interceptor as claimed in claim 16 wherein said high energy-resistance means connection means consists of nuts and bolts.

* * * * *